UNITED STATES PATENT OFFICE.

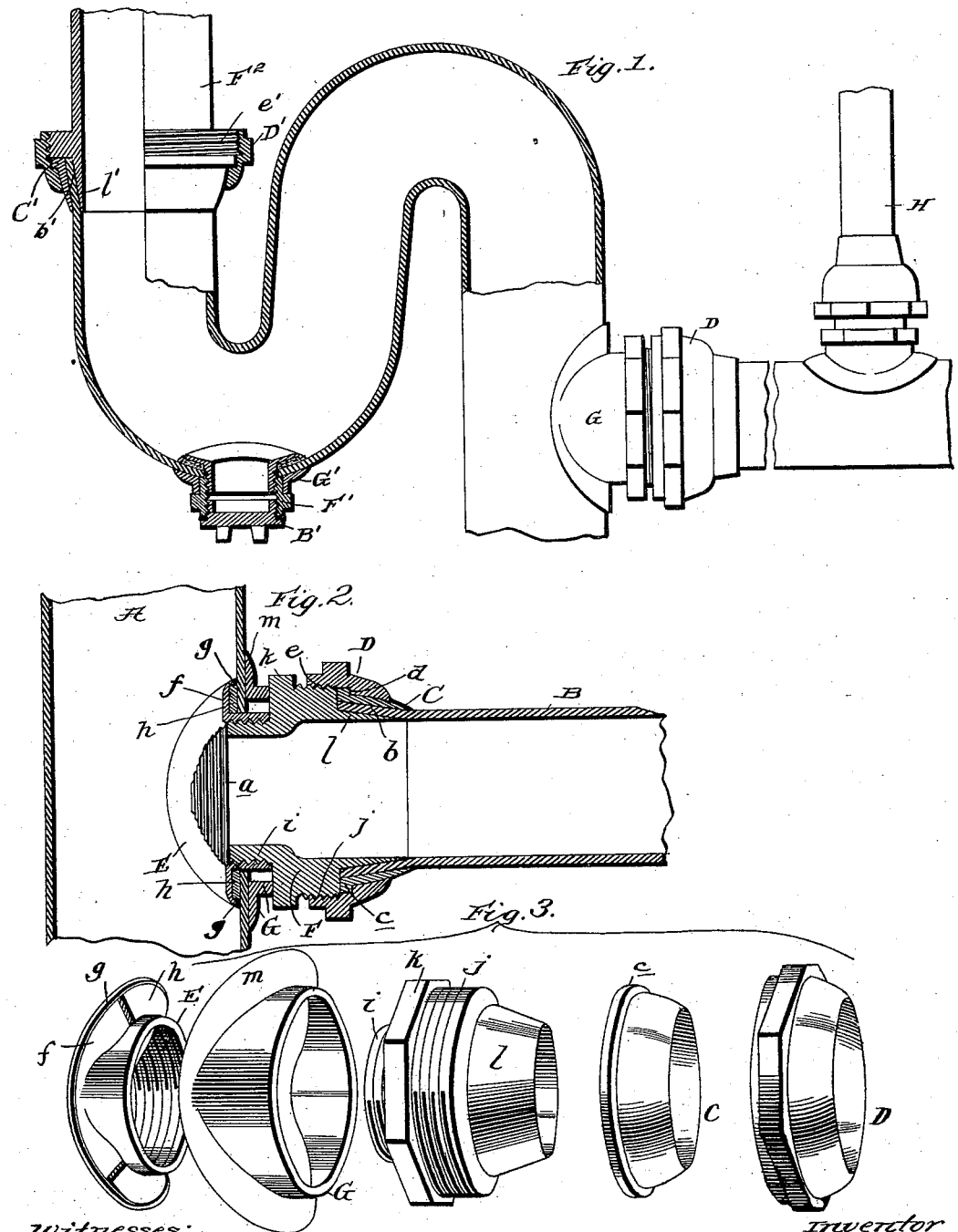

NATHANIEL E. SMITH, OF JERSEY CITY, NEW JERSEY.

COUPLING FOR TRAPS AND PIPES.

SPECIFICATION forming part of Letters Patent No. 591,431, dated October 12, 1897.

Application filed May 13, 1897. Serial No. 636,329. (No model.)

*To all whom it may concern:*

Be it known that I, NATHANIEL E. SMITH, a citizen of the United States, residing at Jersey City, in the county of Hudson and State of New Jersey, have invented certain new and useful Improvements in Couplings for Traps and Pipes; and I do declare the following to be a full, clear, and exact description of the invention, such as will enable others skilled in the art to which it appertains to make and use the same.

My invention relates to sewerage-traps such as are formed of lead and other soft metal, and more particularly to couplings for connecting soft and hard metal pipe-sections and other appurtenances with said traps, and its novelty and many advantages will be fully understood from the following description and claims when taken in conjunction with the annexed drawings, in which—

Figure 1 is a view, partly in section and partly in elevation, illustrating my improved trap, together with the several pipes connected therewith. Fig. 2 is an enlarged detail section illustrating the coupling for connecting a lead-pipe section with the trap at an intermediate point in the length thereof, and Fig. 3 comprises disconnected perspective views of the parts making up such coupling.

In the said drawings similar letters designate corresponding parts in all of the several views, referring to which—

A indicates a sewerage-trap of lead or other soft metal, which has an opening $a$ at an intermediate point in the length thereof.

B indicates a section of lead pipe which has its end contiguous to the trap flared, as indicated by $b$, and C indicates a hard-metal annulus which forms part of my improved coupling and is tapered, as shown, to conform to the flared end $b$ of pipe B, upon which it is mounted and snugly fits, as shown. This annulus C is provided at its inner edge with an outwardly-directed flange $c$, against which is designed to bear the interior shoulder $d$ of the thimble D, which is mounted on the annulus $c$ and has the interiorly-threaded portion $e$ projecting beyond said annulus, for a purpose presently to be described.

E indicates the interiorly-threaded inner section of the coupling, which rests in the aperture $a$ of the trap. This inner section has a flange $f$, shaped in conformity to the interior of the trap, and said flange $f$ in turn has an outwardly-directed marginal flange $g$, which serves in conjunction with the outer side of the section to form a retaining-seat for a gasket or packing $h$, the purpose of which is to render the connection between the section E and the trap water-tight. Interposed between the said section E and the thimble D is a tubular union F. (Better shown in Fig. 2.) This tubular union F has the exteriorly-threaded portion $i$, which engages the interiorly-threaded inner section E, and the exteriorly-threaded portion $j$, which engages the thimble D, and it also has the diametrically-enlarged portion $k$, which is preferably angular to form a wrench-hold, and the tapered end portion $l$, which latter extends within the flared end of the lead-pipe section B, so as to prevent the same from giving inwardly when the thimble is screwed up on the union in making the coupling.

G indicates a bearing-collar which loosely surrounds the exterior portion of the inner section E and has the flange $m$, which is shaped in conformity to and bears against the outer side of the trap, as shown. This collar E enables the union F, when turned, to draw the flange $f$ of the inner section E tight against the trap, and it also serves to reinforce the soft metal of said trap and affords a broad bearing on the same, and consequently prevents the union F, when turned up tight, from drawing the soft metal of the trap out of its original shape or breaking the same down.

In connecting the soft-metal pipe B and trap A through the medium of my improved coupling the annulus C and thimble D are placed on said pipe in their proper relation, and the end of the pipe is then flared. The inner section E and bearing-collar G are then placed in their proper relation to the trap and held by any suitable means until the union F is secured into said inner section and against the collar. The flared end of the pipe B is then brought over the tapered end $l$ of the union, and the thimble $k$ is screwed on the threaded portion $e$ of said union, when the coupling will be completed. This is but one way of assembling the parts in making the coupling, and it is obvious that they may be assembled in any other desired manner.

The coupling described, as will be appreciated from the foregoing, effects a perfectly tight and durable connection between the end of one soft-metal pipe and an intermediate point of another soft-metal pipe or trap, and this without breaking down or impairing either pipe or trap. The coupling is furthermore desirable because of its simplicity and the expedition with which it may be operated to connect or disconnect two pipe-sections or a pipe-section and a trap.

As mentioned above, the coupling is adapted to connect two pipe-sections as readily as it connects one pipe-section and a trap, which latter, strictly speaking, is a pipe-section. An instance of this is shown at the right of Fig. 1, the coupling being interposed between and connecting a soft-metal-pipe section H with the soft-metal-pipe section B.

The coupling is also adapted to detachably connect a plug B' with the base of the trap A in such a manner as to permit of the ready removal of the plug when the trap is to be cleaned and its ready replacement after the trap is cleaned. In this coupling the collar G' is similar to the collar G, before described, and the inner section E' is similar to the section E, with the exception that it is provided with exterior threads instead of interior threads. The union F', however, which receives the threaded plug B', differs from the described union F in that it has interior threads and lacks the threaded portions $e\ i$ and tapered end $l$ of said union F.

A portion of my improved coupling may be also used to effect a connection between the end of the trap or the end of any other soft-metal-pipe section and a hard-metal tubular section, which may be a pipe or a union designed with a pipe. In this construction the hard-metal section F² is exteriorly threaded, as indicated by $e'$, and has a tapered end $l'$, while the end of the trap or soft-metal pipe is flared, as indicated by $b'$, and is surrounded by a tapered annulus C', upon which is loosely mounted a thimble D', interiorly threaded to engage the threads $e'$ of the hard-metal section, as illustrated.

When employed as appurtenances of a sewer-trap, it will be seen that my improvements permit of access being readily gained to any part of the interior of the trap for the purpose of cleaning the same and removing obstructions, and also permit of the several connections being quickly and easily effected after the cleaning of the trap is completed, which is a desideratum in this class of devices.

Having thus described my invention, what I claim is—

1. In a pipe-coupling, the combination of a soft-metal-pipe section having an opening at an intermediate point of length, the threaded, inner coupling-section arranged in the opening of the pipe-section and having a flange shaped in conformity to the interior of the same, a collar surrounding the inner coupling-section and bearing against the outer side of the pipe-section, a tubular, threaded union engaging the inner coupling-section and bearing against the collar and having the tapered outer end, a second soft-metal-pipe section having its end flared and arranged on the tapered end of the union, a tapered annulus mounted on the flared end of the said pipe-section and having a flange, and a thimble loosely mounted on said annulus and having a shoulder engaging the flange of the same and threaded to engage the union, substantially as specified.

2. In a pipe-coupling, the combination of a soft-metal-pipe section having an opening at an intermediate point of its length, the threaded inner coupling-section arranged in the opening of the pipe-section and having a flange $f$, shaped in conformity to the interior of the same and provided with an outwardly-directed marginal flange, packing arranged between the flange $f$, and the inner side of the pipe-section and seated in the channel formed by the marginal flange, a collar surrounding the inner coupling-section and bearing against the outer side of the pipe-section, a tubular threaded union engaging the inner coupling-section and bearing against the collar and having the tapered outer end, a second soft-metal-pipe section having its end flared and arranged on the tapered end of the union, a tapered annulus mounted on the flared end of the said pipe-section and having a flange, and a thimble loosely mounted on said annulus and having a shoulder engaging the flange of the same and threaded to engage the union, substantially as specified.

3. In a coupling, the combination of a soft-metal-pipe section having an opening at an intermediate point of its length, the threaded inner coupling-section arranged in the opening of the pipe-section and having a flange shaped in conformity to the interior of the same and provided with an outwardly-directed marginal flange, packing arranged between the flange $f$, and the inner side of the pipe-section and seated in the channel formed by the marginal flange, a collar surrounding the inner coupling-section and bearing against the outer side of the pipe-section, and a tubular threaded union engaging the inner coupling-section and bearing against the collar, substantially as specified.

4. The combination of a soft-metal-pipe section having its end portion flared and its end square, the tapered annulus arranged on said end portion of the pipe-section and having a flange at its inner end and also having said end square and flush with the end of the soft-metal-pipe section, the thimble mounted on the annulus and having the interior shoulder engaging the flange of the same and also having interior threads in its portion which extends beyond the flange, and the hard-metal, tubular union or pipe-section having a tapered end arranged in the flared end portion of the soft-metal-pipe section and also having exterior threads engaging the interior threads of the thimble and the exterior, square shoulder engaging the square flush ends of the soft-metal-pipe section and annulus, whereby the flared end portion of said soft-metal section is supported on its inner and outer sides by the tapered portion of the union and the annulus, respectively, and is also supported at its end by the shoulder of the union, substantially as specified.

5. In a coupling, the combination of a soft-metal-pipe section having an opening, an inner threaded coupling-section having a flange $f$ surrounding the said opening and shaped in conformity to the interior of the pipe-section and provided with an outwardly-directed marginal flange, packing arranged between the flange $f$, and the inner side of the pipe-section and seated in the channel formed by the marginal flange, an outer coupling-section, connected with the inner coupling-section and a collar interposed between the outer coupling-section and the pipe-section and having a flange shaped in conformity to the exterior of the pipe-section, substantially as specified.

In testimony whereof I affix my signature in presence of two witnesses.

NATHANIEL E. SMITH.

Witnesses:
   ROBERT P. SMITH,
   ARTHUR A. SMITH.